United States Patent [19]

Bingham

[11] 3,973,982

[45] Aug. 10, 1976

[54] COATED PIGMENTS

[75] Inventor: John Francis Bingham, Stourbridge, England

[73] Assignee: Ferro Corporation, Cleveland, Ohio

[22] Filed: Feb. 7, 1975

[21] Appl. No.: 547,920

[30] Foreign Application Priority Data

Aug. 6, 1974 United Kingdom............... 34642/74

[52] U.S. Cl............................. 106/298; 106/308 Q
[51] Int. Cl.²....................... C09C 1/20; C09C 3/00
[58] Field of Search....................... 106/308 Q, 298

[56] References Cited
UNITED STATES PATENTS

| | | | |
|---|---|---|---|
| 3,470,007 | 9/1969 | Linton | 106/298 |
| 3,656,986 | 4/1972 | Buckley et al. | 106/308 Q X |
| 3,660,130 | 5/1972 | Buckley et al. | 106/308 Q X |
| 3,728,142 | 4/1973 | Rudolph et al. | 106/308 Q X |
| 3,748,163 | 7/1973 | Mutaffis et al. | 106/308 Q X |
| 3,773,535 | 11/1973 | Burgyan et al. | 106/308 Q X |
| 3,826,670 | 7/1974 | Rees | 106/308 Q |
| 3,849,152 | 11/1974 | Mineault | 106/308 Q |

*Primary Examiner*—Patrick P. Garvin
*Assistant Examiner*—William G. Wright
*Attorney, Agent, or Firm*—Milton L. Simmons

[57] ABSTRACT

This invention relates to pigments and, more particularly, to the provision of a coating on pigments to improve their heat stability and/or abrasion resistance.

15 Claims, No Drawings

COATED PIGMENTS

THE ART

As is well known, pigments are blended with polymeric materials, particularly but not exclusively thermoplastic resins, to impart a desired color or appearance thereto. However, in the subsequent processing of polymer/pigment blends to form the desired plastics article, the pigment is often subjected to heat and abrasion which deleteriously affect it. For example, exposure to heat can change the color of the pigment. It is known to protect pigment particles against abrasion and the effects of heat by providing on their surface a coating of, for example, silica or alumina.

I have now found that pigment particles can be protected against abrasion and/or heat by providing thereon coatings of certain aromatic carboxylic acids or insoluble (i.e. insoluble in water or aqueous acidic solutions) metal salts thereof. These coatings are hereinafter referred to, for convenience only, as "acid coatings."

The aromatic carboxylic acids and salts thereof which may be used to best advantage are those which are solid and do not substantially soften over the temperature range to which the coated pigment will be exposed in its subsequent use. Generally, this range will be up to about 280°C, although as will be clear to those skilled in the art, the maximum temperature may sometimes be above or below this figure depending on the use to which the coated pigment is to be put.

Among the acids which may be used are phthalic, isophthalic, terephthalic, benzoic, o-, m- and p- toluic acids, 2, 4, 6- trimethylbenzoic, anisic, salicylic, acetylsalicylic, protocatechuic, diphenylacetic, p- hydroxyphenylacetic, 2, 4, 6- trichlorobenzoic, 4, 6- dichloroisophthalic, 2- aminoisophthalic, 4, 5- dimethoxyisophthalic (isohemipinic), 4- hydroxyisophthalic, trimesic, pyromellitic, naphthoic and naphthalic acid. Their insoluble salts may also be used, including for example the calcium, barium, aluminium or lead salts.

The acid coatings of the present invention may be applied directly onto the pigment particles, or they may be applied to particles which already have a coating, such as a silica or alumina coating. In both cases, the acid coatings improve the heat stability and/or abrasion resistance of the pigment.

The thickness of the acid coating is not especially critical although, as will be well understood, thicker coatings give better abrasion resistance than thinner coatings. In general, the acid coating weight will be from about 1 to 50% of the weight of the pigment (coated or uncoated) on to which it is to be applied. Where the acid coating is applied over a silica or alumina coating, the silica coating will usually comprise from 2 to 50% by weight of the pigment and the alumina from 0.2 to 50% by weight of the pigment (both percentages being on the same basis as above).

The invention is particularly, but not exclusively, applicable to the coating of lead chrome pigments. As is well known, such pigments include relatively pure lead chromate in the shade known as "medium yellow", solid solutions of lead chromate and lead sulphate in shades known as "primrose or lemon yellow" and solid solutions of lead chromate, lead sulphate and lead molybdate in shades known as "molybdate oranges or reds."

The acid coatings of the invention may be applied in any convenient manner. For example, the coating acid or salt can be precipitated from solution onto the pigment particles which may conveniently be in the form of an aqueous slurry. Alternatively, a solution coating technique may be used in which pigment particles are coated with a solution of the acid (e.g. isophthalic acid in ethanol) and the solvent is then removed by evaporation. The solvent coating technique is generally more applicable with the acids rather than the acid salts because of the lack of suitable volatile solvents for the latter.

Where the acid coatings are to be formed on an existing silica, alumina, titanium oxide and/or other coating(s), these latter coatings can be formed by methods known in the art (for example, U.S. Pat. Nos. 1,178,938 and 3,773,535) or as described in our co-pending British Application No. 31642/73 which describes precipitating a silica coating from aqueous solution. Reference should be made to these and other specifications relating to this art, for further details.

Generally, the acid or acid salt coatings of the present invention form the only, or the outermost, coating on the pigment. However, one or more further coatings can be applied over the acid or acid salt coatings if desired, for example to improve their resistance to chemical attack. For example, a coating of polyethylene wax (e.g. Hoechst Hordamer PE01) or of polysiloxane (e.g. Dow Corning DC1107) may be used, the coating weight generally being from 1 to 50% by weight of the pigment.

In order that the invention may be more fully understood, the following Examples are given by way of illustration only. Parts and percentages are by weight unless otherwise noted.

EXAMPLE 1

A slurry was made from 50 parts of commercially available chrome yellow pigment, of a composition including lead chromate and lead sulphate, in 500 parts of water at between 15° and 50°C. With good agitation, 50 parts of sodium chloride were added, and over a period of three hours, 31.5 parts of sodium silicate solution (36.2% $Na_2Si_3O_7$) diluted in 150 parts of water and 4.9 parts of ammonium sulphate dissolved in 150 parts of water were added together at a pH of between 7 and 10. The resulting slurry was stirred for a further 20 minutes at between 15° and 50°C, and then washed two times with 1,000 parts of water by decantation. To an agitated slurry of this washed silica-coated lead chrome pigment (500 parts, containing 50 parts of pigment), was added a solution of 7.5 parts isophthalic acid and 3.61 parts sodium hydroxide in 50 parts of water. After ten minutes, 10% sulphuric acid was added slowly until a pH of 2 was maintained. Stirring was continued for a further 15 minutes. The slurry was then filtered, the cake washed thoroughly with water, dried in an oven and then powdered. There was thus produced a silica-coated pigment having an outer coat of isophthalic acid. The coating weights were 14% silica and 13.2% isophthalic acid.

EXAMPLE 2

A slurry was made from 50 parts of commercially available chrome scarlet pigment, of composition including lead chromate, lead sulphate and lead molybdate, in 500 parts of water at 90°–95°C. With good agitation, a solution of 31.5 parts of sodium silicate solution (36.2% $Na_2Si_3O_7$) diluted in 150 parts of water and 4.9 parts of ammonium sulphate dissolved in 150 parts of water, were added together slowly over a period of three hours. Agitation was continued for a further 20 minutes at 90°–95°C and the slurry was then washed two times with 1,000 parts of water by decantation. The silica-coated pigment was then coated with isophthalic acid in a manner similar to that described in Example 1. The coating weights were 14% silica and 13.2% isophthalic acid.

EXAMPLE 3

A slurry was made from 50 parts of commercially available chrome yellow pigment, of composition including lead chromate and lead sulphate, and 500 parts of water. With good agitation, a solution of 12.5 parts isophthalic acid and 6.02 parts of sodium hydroxide in 100 parts of water was added. After ten minutes, 10% sulphuric acid was added slowy until a pH of 4.0 was maintained. Stirring was continued for a further fifteen minutes and the product isolated as in Example 1. There was thus prepared an isophthalic acid coated pigment, the coating weight being 25 percent.

EXAMPLE 4

A slurry was made from 50 parts of commercially available chrome scarlet pigment of composition including lead chromate, lead sulphate and lead molybdate, in 500 parts of water. With good agitation, a solution of 28.5 parts aluminum sulphate in 100 parts of water was added and, after 10 minutes, 10% sodium hydroxide solution was added to a pH 7.0. A solution of 8.3 parts of isophthalic acid and 4.0 parts sodium hydroxide in 50 parts of water was added and, after ten minutes, 10% sulphuric acid was added slowly until a pH of 4.0 was maintained. Stirring was continued for a further fifteen minutes and the product isolated as in Example 1. The product was alumina-coated pigment having an outer coating of isophthalic acid. The coating weights were 10% alumina and 15.1% isophthalic acid.

EXAMPLE 5

A portion of washed slurry from Example 1 containing 50 g of silica-coated lead chrome pigment (but no isophthalic acid coating) was agitated with a solution of 7.5 parts isophthalic acid and 3.61 parts sodium hydroxide in 100 parts of water. To this was slowly added a solution of 8 parts calcium chloride (70.75 percent) in 30 parts of water and after ten minutes additional additional stirring the product was isolated as in Example 1. The product was a silica-coated pigment having an outer coating of calcium isophthalate. The coating weights were 14% silica and 18.4% calcium isophthalate.

The heat stability and abrasion resistance of the coated pigments prepared in Examples 1 to 5 were evaluated in high and low density polyethylene, polypropylene, polystyrene and ABS. Polyer granule/pigment blends were prepared using a "Red Devil" shaker (shake times up to five minutes) and then injection moulded at temperatures up to 300°C. With dwell times of up to five minutes, the results showed improved heat stability over conventional lead chrome pigments coated with silica only. The most significant improvements were obtained with pigments coated with silica and isophthalic acid or its calcium salt. Slightly inferior to these products were the pigments coated with alumina and isophthalic acid or calcium isophthalate. Pigments coated with isophthalic acid or calcium isophthalate alone were the least satisfactory products tested but these were, however, superior to uncoated conventional lead chrome pigments.

EXAMPLE 6

A portion of washed slurry from Example 1 containing 50 g of silica-coated lead chrome pigment (but no isophthalic acid coating) was agitated with a solution of 7.5 parts benzoic acid and 5.0 parts sodium hydroxide in 100 parts of water. After ten minutes, 10% sulphuric acid was added slowly until a pH of 4.0 was maintained. Stirring was continued for a further fifteen minutes and the product isolated as in Example 1. The product was a silica-coated pigment having an outer coating of benzoic acid. The coating weights were 14% silica and 17% benzoic acid.

EXAMPLE 7

A portion of washed slurry prepared as in Example 1 containing 50 g of silica-coated lead chrome pigment (but not isophthalic acid coating) was agitated with a solution of 7.5 parts salicyclic acid and 4.0 parts sodium hydroxide in 100 parts of water. After ten minutes, 10% sulphuric acid was added slowly until a pH of 4.0 was maintained. Stirring was continued for a further fifteen minutes and the product isolated as in Example 1. The product was a silica-coated pigment having an outer coating of salicylic acid. The coating weights were 14% silica and 17% salicyclic acid.

EXAMPLE 8

A portion of washed slurry prepared as in Example 1 containing 50 g of silica-coated lead chrome pigment (but no isophthalic acid coating) was agitated with a solution of 7.5 parts terephthalic acid and 5.0 parts of potassium hydroxide in 100 parts of water. After ten minutes, 10% sulphuric acid was added slowly until a pH of 4.0 was maintained. Stirring was continued for a further fifteen minutes and the product isolated as in Example 1. The product was a silica-coated pigment having an outer coating of terephthalic acid. The coating weights were 14% silica and 17% terephthalic acid.

EXAMPLE 9

A portion of washed slurry prepared as in Example 1 containing 50 g of silica-coated lead chrome pigment (but no isophthalic acid coating) was agitated with a solution of 7.5 parts isophthalic acid and 3.61 parts sodium hydroxide in 100 parts of water. To this was slowly added a solution of 15 parts lead nitrate in 100 parts of water and, after ten minutes additional stirring, the product was isolated as in Example 1. The product was a silica-coated pigment with an outer coating of lead isophthalate. The coating weights were 14% silica and 33.5% lead isophthalate.

EXAMPLE 10

A portion of slurry prepared as in Example 4 containing 55 g of alumina-coated lead chrome pigment was agitated with a solution of 5.5 parts isophthalic acid and 2.67 parts sodium hydroxide in 100 parts of water. To this was slowly added 10% sulphuric acid until a pH of 4.0 was maintained. After a further ten minutes stirring, 23 parts of Hordamer PE01 polyethylene emulsion (containing 40% w/w polyethylene) was added and then 10% sulphuric acid added slowly until a pH of 2.0 was maintained. After fifteen minutes additional stirring, the product was isolated as in Example 1. There was thus prepared an alumina/isophthalic acid-coated pigment with an outer coating of polyethylene wax. The coating weights were 10% alumina, 10% isophthalic acid and 15% polyethylene.

This method of coating pigments with polyethylene is described in our copending application British Pat. No. 31642/73, to which reference should be made for further details.

EXAMPLE 11

A portion of washed slurry prepared as in Example 1, containing 50 g of silica-coated lead chrome pigment (but no isophthalic acid coating) was agitated with 2.0 parts isophthalic acid and 0.96 parts sodium hydroxide in 100 parts of water. To this was slowly added a solution of 1.33 parts calcium chloride (70.75 percent) in 10 parts of water. After ten minutes additional stirring, 5.25 parts of DC1107 were added and after ten minutes further stirring, 0.35 parts sodium hydroxide was added. Stirring was continued for one hour and the product then isolated as in Example 1. There was thus prepared a silica/calcium isophthalate coated pigment with an outer coating of polysiloxane. The coating weights were 14% silica, 5% calcium isophthalate and 5% polysiloxane.

I claim:

1. A method of manufacturing particulate chrome pigments having good abrasion resistance and color stability, which comprises encapsulating the pigment particles in a coating selected from the class consisting of aromatic carboxylic acids and their insoluble salts, singly or in combination, the amount of said coating totalling between about 1 to 50 percent of the total weight of the coated product, and recovering said pigment in the form of individual particles each having said coating composition overlaying and encapsulating said pigment particle.

2. A chrome pigment having good abrasion resistance and color stability, consisting essentially of individual pigment particles each having a surface coating thereon consisting of, singly or in combination, a compound selected from the class consisting of aromatic carboxylic acids and their insoluble salts, said coating present on each said particle in an amount of from about 1 to 50 percent of the total weight of the coated particles.

3. A method of manufacturing particulate chrome pigments having good abrasion resistance and color stability which comprises first encapsulating said pigment particles in a surface coating of silica in an amount between about 2 to 50 weight percent of said pigment, then encapsulating said silica coated pigment particles in a coating selected from the class consisting of aromatic carboxylic acids and their insoluble salts, singly or in combination, the amount of said coating composition totalling between about 1 to 50 percent of the total weight of the coated product, and recovering said pigment in the form of individual particles each having said coating composition overlaying and encapsulating said pigment particle.

4. A method of manufacturing particulate chrome pigments having good abrasion resistance and color stability which comprises first encapsulating said pigment particles in a surface coating of alumina in an amount between about 0.2 to 50 weight percent of said pigment, then encapsulating said alumina coated pigment particles in a coating selected from the class consisting of aromatic carboxylic acids and their insoluble salts, singly or in combination, the amount of said coating composition totalling between about 1 to 50 percent of the total weight of the coated product, and recovering said pigment in the form of individual particles each having said coating composition overlaying and encapsulating said pigment particle.

5. A chrome pigment having good abrasion resistance and color stability consisting essentially of individual pigment particles, each said particle having a first surface coating thereon consisting of a compound selected from the class consisting of silica and alumina, in an amount of silica of from about 2 to 50 weight percent of said pigment, and of alumina of from about 0.2 to 50 weight percent of said pigment, each said coated pigment particle having a second, outer surface coating thereon consisting of, singly or in combination, a compound selected from the class consisting of aromatic carboxylic acids and their insoluble salts, said second coating present on each said particle in an amount from about 1 to 50 percent of the total weight of said final, coated particle.

6. The method of claim 1 wherein the class of aromatic carboxylic acids is selected from the group consisting of phthalic, isophthalic, terephthalic, benzoic, o-, m- and p- toluic, 2, 4, 6- trimethylbenzoic, anisic, salicylic, acetylsalicylic, protocatechuic, diphenylacetic, p- hydroxyphenylacetic, 2, 4, 6- trichlorobenzoic, 4, 6- dichloroisophthalic, 2- aminoisophthalic, 4, 5- dimethoxyisophthalic (isohemipinic), 4- hydroxyisophthalic, trimesic, pyromellitic, naphthoic and naphthalic; and the class of insoluble salts of said aromatic carboxylic acids consists essentially of the calcium, barium, aluminum and lead salts of the foregoing acids.

7. The pigment of claim 2 wherein the class of aromatic carboxylic acids is selected from the group consisting of phthalic, isophthalic, terephthalic, benzoic, o-, m- and p- toluic, 2, 4, 6- trimethylbenzoic, anisic, salicyclic, acetylsalicylic, protocatechuic, diphenylacetic, p- hydroxyphenylacetic, 2, 4, 6- trichlorobenzoic, 4, 6- dichloroisophthalic, 2- aminoisophthalic, 4, 5- dimethoxyisophthalic (isohemipinic), 4- hydroxyisophthalic, trimesic, pyromellitic, naphthoic and naphthalic; and the class of insoluble salts of said aromatic carboxylic acids is selected from the group consisting of their calcium, barium, aluminum and lead salts.

8. The method of claim 3 wherein the class of aromatic carboxylic acids is selected from the group consisting of phthalic, isophthalic, terephthalic, benzoic, o-, m- and p- toluic, 2, 4, 6- trimethylbenzoic, anisic, salicylic, acetylsalicylic, protocatechuic, diphenylacetic, p- hydroxyphenylacetic, 2, 4, 6- trichlorobenzoic, 4, 6- dichloroisophthalic, 2- aminoisophthalic, 4, 5- dimethoxyisophthalic (isohemipinic), 4- hydroxyisophthalic, trimesic, pyromellitic, naphthoic and naphthalic; and the class of insoluble salts of said aromatic carboxylic acids is selected from the group consisting of the calcium, barium, aluminum and lead salts of the foregoing acids.

9. The method of claim 4 wherein the class of aromatic carboxylic acids is selected from the group consisting of phthalic, isophthalic, terephthalic, benzoic, o-, m- and p- toluic, 2, 4, 6- trimethylbenzoic, anisic, salicylic, acetylsalicylic, protocatechuic, diphenylacetic, p- hydroxyphenylacetic, 2, 4, 6- trichlorobenzoic, 4, 6- dichloroisophthalic, 2- aminoisophthalic, 4, 5- dimethylisophthalic (isohemipinic), 4- hydroxyisophthalic, trimesic, pyromellitic, naphthoic and naphthalic; and the class of insoluble salts of said aromatic carboxylic acids is selected from the group consisting of the calcium, barium, aluminum and lead salts of the foregoing acids.

10. The pigment of claim 5 wherein the class of aromatic carboxylic acids is selected from the group consisting of phthalic, isophthalic, terephthalic, benzoic, o-, m- and p- toluic, 2, 4, 6- trimethylbenzoic, anisic, salicylic, acetylsalicylic, protocatechuic, diphenylacetic, p- hydroxyphenylacetic, 2, 4, 6- trichlorobenzoic, 4, 6- dichloroisophthalic, 2- aminoisophthalic, 4, 5- dimethoxyisophthalic (isohemipinic), 4- hydroxyisophthalic, trimesic, pyromellitic, naphthoic and naphthalic; and the class of insoluble salts of said aromatic carboxylic acids is selected from the group consisting of their calcium, barium, aluminum and lead salts.

11. The method of claim 1 wherein the class of aromatic carboxylic acids is selected from the group consisting of isophthalic, benzoic, salicylic and terephthalic; and the class of insoluble salts of said acids is selected from the group consisting of calcium isophthalate and lead isophthalate.

12. The pigment of claim 2 wherein the class of aromatic carboxylic acids is selected from the group consisting of isophthalic, benzoic, salicylic and terephthalic; and the class of insoluble salts of said acids is selected from the group consisting of calcium isophthalate and lead isophthalate.

13. The method of claim 3 wherein the class of aromatic carboxylic acids is selected from the group consisting of isophthalic, benzoic, salicylic and terephthalic; and the class of insoluble salts of said acids is selected from the group consisting of calcium isophthalate and lead isophathalate.

14. The method of claim 4 wherein the class of aromatic carboxylic acids is selected from the group consisting of isophthalic, benzoic, salicylic and terephthalic; and the class of insoluble salts of said acids is selected from the group consisting of calcium isophthalate and lead isophthalate.

15. The pigment of claim 5 wherein the class of aromatic carboxylic acids is selected from the group consisting of isophthalic, benzoic, salicylic and terephthalic; and the class of insoluble salts of said acids is selected from the group consisting of calcium isophthalate and lead isophthalate.

* * * * *